United States Patent
Yamada et al.

[19]

[11] Patent Number: 6,149,523
[45] Date of Patent: Nov. 21, 2000

[54] IMAGE SYNTHESIS METHOD, GAMES MACHINE AND INFORMATION STORAGE MEDIUM WITH SEQUENCE CHECKING

[75] Inventors: Masanori Yamada; Naoki Ito, both of Yokohama; Masahiro Kimoto, Setagaya-ku, all of Japan

[73] Assignee: Namco Ltd., Tokyo, Japan

[21] Appl. No.: 08/930,486

[22] PCT Filed: Feb. 28, 1997

[86] PCT No.: PCT/JP97/00607

§ 371 Date: Oct. 1, 1997

§ 102(e) Date: Oct. 1, 1997

[87] PCT Pub. No.: WO97/32642

PCT Pub. Date: Sep. 12, 1997

[30] Foreign Application Priority Data

Mar. 6, 1996 [JP] Japan ................................. 8-078343

[51] Int. Cl.[7] ................................................. A63F 13/00
[52] U.S. Cl. ................................. 463/31; 463/9; 463/37; 463/35
[58] Field of Search ................................. 463/30–39, 9; 273/148 B; 434/258, 236, 307, 308, 309

[56] References Cited

U.S. PATENT DOCUMENTS

| | | | |
|---|---|---|---|
| 5,169,319 | 12/1992 | Potoclsi | 434/236 |
| 5,267,734 | 12/1993 | Stamper et al. | 273/148 B |
| 5,317,505 | 5/1994 | Karabed et al. | 273/148 B |
| 5,344,324 | 9/1994 | O'Donnell et al. | 434/258 |
| 5,649,861 | 7/1997 | Okano et al. | 463/36 |
| 5,759,100 | 6/1998 | Nakanishi | 463/37 |
| 5,769,719 | 6/1998 | Hsu | 463/37 |

FOREIGN PATENT DOCUMENTS

| | | |
|---|---|---|
| 2-283390 | 11/1990 | Japan . |
| 7-200165 | 8/1995 | Japan . |

*Primary Examiner*—Valencia Martin-Wallace
*Assistant Examiner*—John Paradiso
*Attorney, Agent, or Firm*—Oliff & Berridge, PLC

[57] ABSTRACT

The objective of this invention is to provide an image synthesis method, sound synthesis method, games machine and information storage medium for making it easy to learn a complicated operating sequence from a game controller. This system determines whether an input sequence by which operating buttons are pressed in sequence matches a standard sequence that is specified by standard operations (41) to (51). If the input sequence matches, a matching identification symbol lights up. When an operating button is pressed, an identification sound that identifies the press operating button is output. The player can perceive the operations to be input and the operations that the player has input from these identification symbols and sounds. This makes it easy to acquire special techniques used in a fighting game. Outputting identification symbols and sounds in this manner is particularly effective in a training mode.

30 Claims, 8 Drawing Sheets

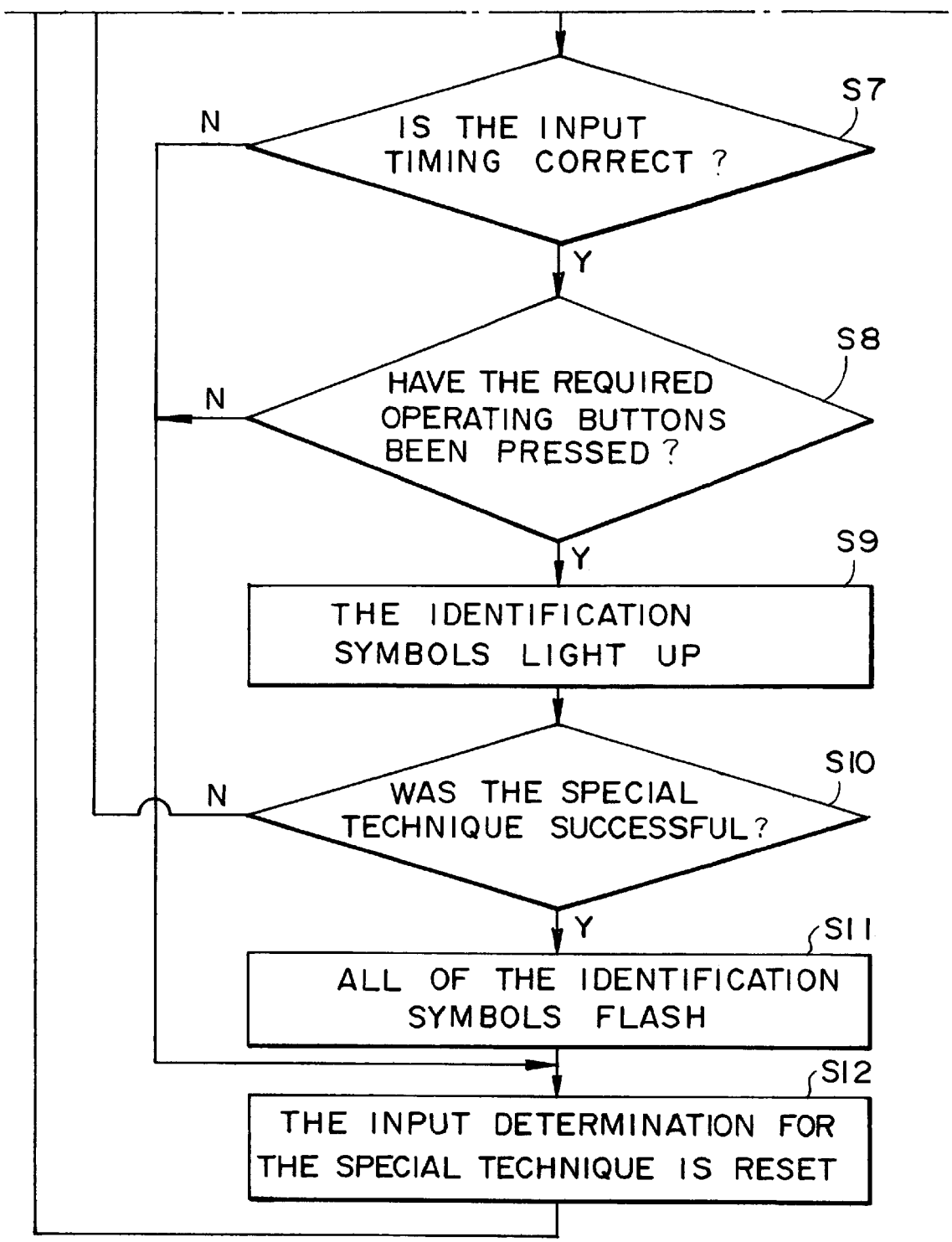
FIG.3 (Con't)

FIG.4A
SELECT A MODE:
COMBAT MODE
OPTION MODE
| TRAINING MODE |
FIG.4B
SELECT A SPECIAL TECHNIQUE:
| SPECIAL TECHNIQUE 1 |
SPECIAL TECHNIQUE 2
SPECIAL TECHNIQUE 3
SPECIAL TECHNIQUE 4
SPECIAL TECHNIQUE 1
WHEN FACING RIGHT
FIG.4C
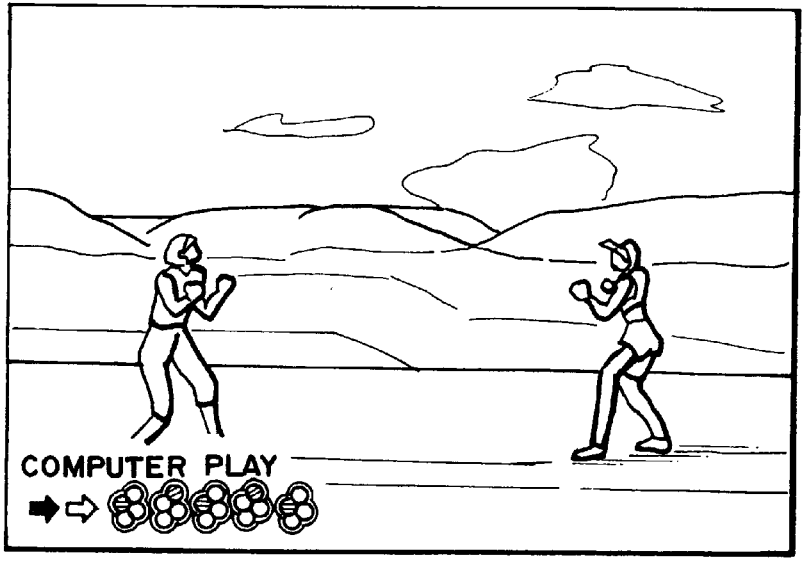
COMPUTER PLAY

IMAGE SYNTHESIS METHOD, GAMES MACHINE AND INFORMATION STORAGE MEDIUM WITH SEQUENCE CHECKING

TECHNICAL FIELD

This invention relates to an image synthesis method, a sound synthesis method, a games machine, and an information storage medium.

BACKGROUND OF THE INVENTION

With a fighting game or the like, a player enjoys the game by causing a game character manipulated by the player to fight a game character manipulated by a computer or opposing player on a screen. Such a fighting game is highly popular as a game that enables players to experience the feeling of actually fighting each other.

With a game such as a fighting game, manipulating a cross-shaped key and operating buttons of a game controller in a given sequence (a sequence in which, for instance, a left portion of the cross-shaped key is pressed before buttons A and B are pressed in sequence) causes the game character to perform a special technique. If this special technique is successful, it is possible to inflict a great deal of damage to the opponent, so that the success or otherwise of the special technique has a large effect on the game result. Therefore, the quality of the player's manipulation skills depends on whether a special technique is smoothly performed or not.

However, such an operating sequence is generally complicated and it is an extremely difficult task for the player to learn this operating sequence and reproduce it. If a case is considered in which the operating buttons A and B are pressed in sequence, for example, a time interval from the pressing of A to the pressing of B must be within a given time, and this timing further increases the difficulty experienced by the player. It is also not easy to describe such an operating sequence in the manual or other documentation that comes with the game software, and it is particularly difficult to describe the timing of operations in words, so it has been inevitable that such descriptions become ambiguous.

This invention has been devised in order to solve the above technical problem and has as its objective the provision of an image synthesis method, sound synthesis method, games machine, and information storage medium for facilitating acquisition of complicated operations of a game controller.

DISCLOSURE OF THE INVENTION

In order to solve the above described problem, this invention provides an image synthesis method for synthesizing a game image: determining whether or not an input sequence matches a given standard sequence, the input sequence being specified by a first input operation that is input first by a game controller, a second input operation that is input second by the game controller, and so on until an Nth (where $N \geq 2$) input operation that is input at an Nth time by the game controller; and providing at least one of a display that indicates matched input operations and a display that indicates non-matched input operations, the display being provided by using identification symbols for visually identifying the details of each operation.

In accordance with this aspect of the invention, a determination is made as to whether a sequence specified by first to Nth input operations matches or does not match a standard sequence, and an identification symbol is used as at least one type of display indicating that an input operation matches or does not match. Assume for example that a player inputs a series operations by pressing a first operating button of a game controller (a first input operation), pressing second and third operating buttons simultaneously (second input operation), and pressing a fourth operating button (third input operation). If the first and second input operations match the standard sequence but the third operation does not match it, identification symbols are used as a display to confirm that fact. In this case, the matching operations could be displayed so that the player can see them, or the non-matching operations could be displayed so that the player can see them, or both could be displayed. This makes it possible for the player to readily perceive which of the input operations matches or does not match, making it easy for the player to learn a complicated manipulation for performing a special technique. Note that, when the input sequence matches the standard sequence from the first to Mth (where $M \leq N$) input operations, this invention could be used to use identification symbols to display the fact that these first to Mth input operations do match. In other words, the matching or non-matching display could be set so that it only occurs when the sequence from the first input operation matches.

Details of first to Nth standard operations that specify the standard sequence may be displayed beforehand by using identification symbols, and when first to Mth (where $M \leq N$) input operations match first to Mth standard operations, a display state of identification symbols of matching first to Mth standard operations may be caused to change. This configuration makes it possible for the player to readily perceive which standard operation is matched by an input operation. Note that a method such as one that causes matching identification symbols to flash or light up could be used as the method of changing the display state.

This invention also provides an image synthesis method for synthesizing a game image: displaying identification symbols for visually identifying the details of each operation when a first input operation is input first by a game controller, a second input operation is input second by the game controller, and so on until an Nth (where $N \geq 2$) input operation is input at an Nth time by the game controller; and determining whether or not an input sequence specified by the first to Nth input operations matches a given standard sequence.

In accordance with this aspect of the invention, operations that are input through a game controller can be perceived visually by the player. This makes it possible to allow the player to perceive whether an input has succeeded or failed, making it easy to learn complicated manipulations.

When the game controller has a plurality of operating buttons, at least one of the identification symbols may be a symbol that identifies which of this plurality of operating buttons has been operated. This makes it possible to indicate whether an input sequence matches or does not match a standard sequence, by displaying an identification symbol that indicates that a first operating button has been pressed, an identification symbol that indicates that second and third operating buttons have been pressed simultaneously, and so on.

At least one of the identification symbols may be a symbol with different colors to represent operating buttons having different dispositions on the game controller. This makes it possible for the player to perceive details of operations from differences or similarities of colors, thus enabling an increase in the player's degree of perception of the operation details.

When the game controller has a direction input means for inputting a plurality of directions, at least one of the identification symbols may be a symbol for identifying one direction of this plurality of directions. This facilitates perception of the operation details of a direction input means such as a plurality of operating buttons, a cross-shaped key, or a direction joystick.

At least one of the identification symbols may be a symbol indicating an insertion of a given time interval between a (K−1)th (where K≦N) input operation and a Kth input operation. This makes it possible to visually perceive an operation of inserting a given time interval.

Moreover, the image synthesis method may sequentially output identification sounds for aurally identifying the details of each operation, synchronizing the output of the identification sounds with at least one of input timing of the first to Nth input operations and reference timing of the standard sequence. This makes it possible for the player to comprehend the details of operations by both images and sounds, facilitating the acquisition of the timing at which operations are input.

This invention also provides a sound synthesis method for synthesizing game sounds: sequentially outputting identification sounds for aurally identifying the details of each operation, synchronizing the output of the identification sounds with input timing of first to Nth (where N≧2) input operations, when a first input operation is input first by a game controller, a second input operation is input second by the game controller, and so on until an Nth input operation is input at an Nth time by the game controller; and determining whether or not an input sequence specified by the first to Nth input operations matches a given standard sequence.

This aspect of the invention makes it possible for the player to comprehend the details of operations from means such as different pitches of the identification sounds. It also enables subtle adjustment of the timing at which operations are input, facilitating the acquisition of complicated input timings.

The sound synthesis method may sequentially output the identification sounds corresponding to the standard sequence, synchronizing the output of the identification sounds with the reference timing of the standard sequence. This makes it possible to easily describe to the player the timing of the standard sequence for reference.

The identification symbols or the identification sounds may be displayed in a training mode for enabling a player to practice operations. This makes it possible for the player to fight another player or the computer after repeatedly practicing complicated manipulations in a training mode.

The display of identification symbols or the output of identification sounds in accordance with the standard sequence may be performed in training mode by a computer as selected by a player. This makes it possible for the player to visually or aurally acquire a standard sequence by seeing identification symbols or hearing identification sounds that are output by the computer. This is intended to facilitate manipulation practice in the training mode.

BRIEF DESCRIPTION OF DRAWINGS

FIGS. 4A, 4B, and 4C show selection screens and the like displayed by this embodiment.

BEST MODE FOR CARRYING OUT THE INVENTION

Embodiments of this invention will now be described with reference to the accompanying figures.

Figure 1A:
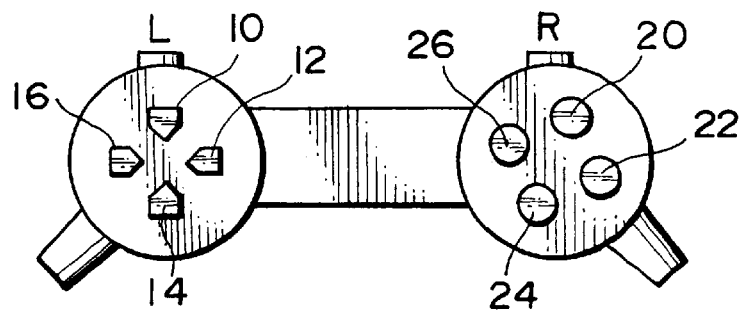
FIG. 1A shows an example of a game controller and FIGS. 1B and 1C show examples of game images displayed by this embodiment of the present invention.
Figure 1B:
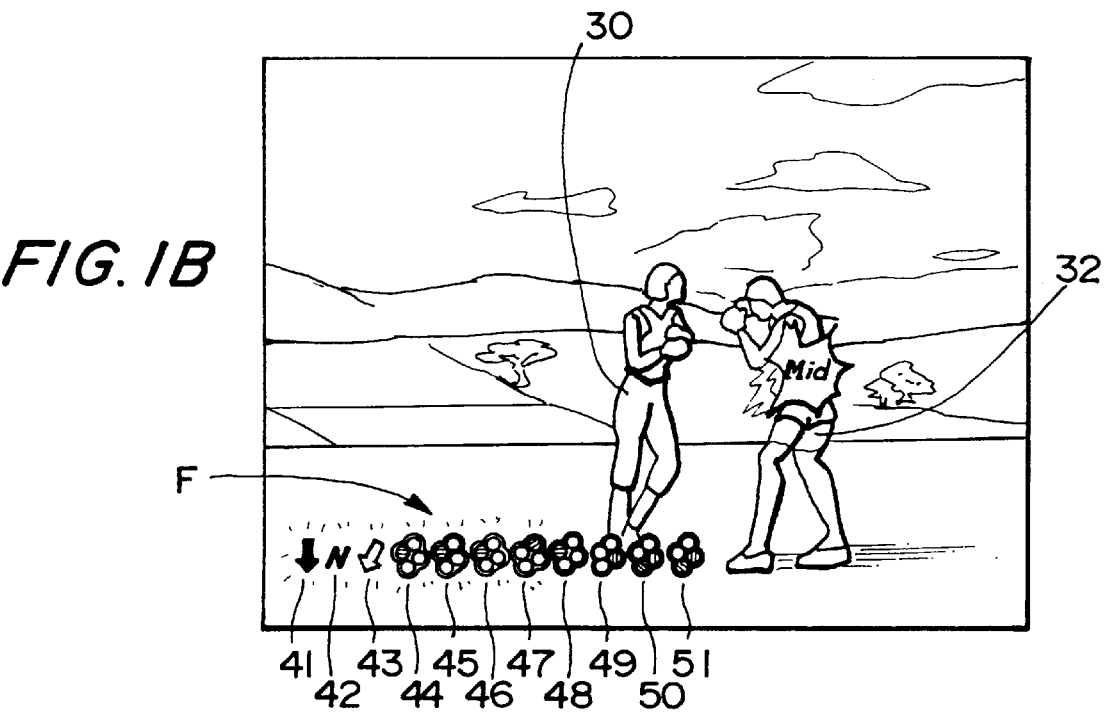
Figure 1C:
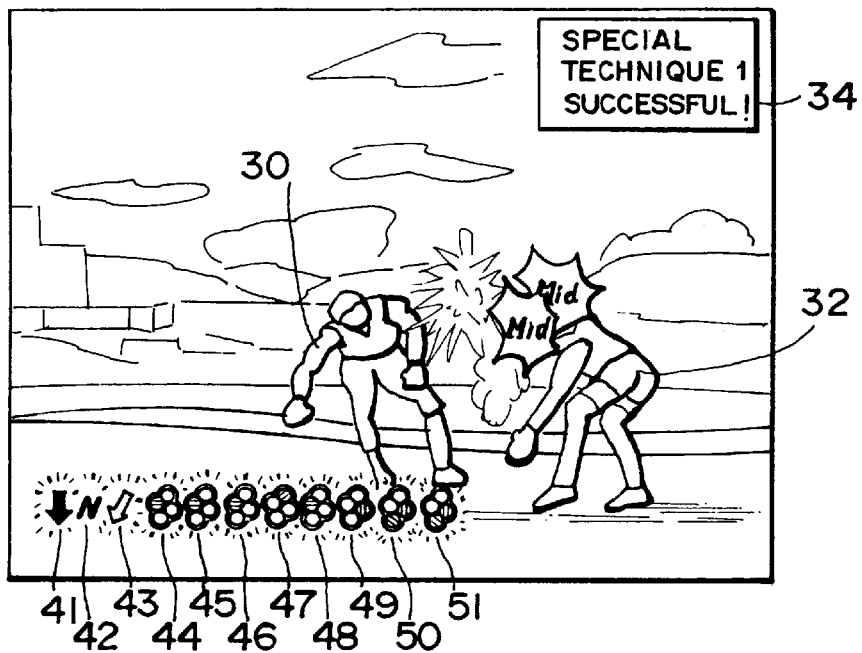

An example of a game controller used in this embodiment is shown in FIG. 1A and examples of game images displayed by this embodiment are shown in FIGS. 1B and 1C. Operating buttons 10, 12, 14, and 16 act as direction input means. When one of the operating buttons 10, 12, 14, and 16 is pressed, a game character 30 manipulated by the player can be made to perform an operation such as jump, move to the right, crouch down, or move to the left. Furthermore, operating buttons 20, 22, 24, and 26 make the game character 30 perform actions such as punching and kicking. In this manner, the player can manipulate the game controller to make the game character 30 move and thus fight another game character 32 operated by an opposing player or the computer.

With this embodiment, a determination is made as to whether or not a given standard sequence is matched by an input sequence specified by first to Nth input operations that are input sequentially from a game controller. Identification symbols denoted by F in FIG. 1B are used to inform the player whether input operations match or don't match. In this embodiment, when the sequence of first to Mth (where M≦N) input operations matches the standard sequence, the display shows that the first to Mth input operations matched. Furthermore, details of the first to Nth standard operations 41 to 51 that specify the standard sequence are previously displayed by using identification symbols, as shown by F in FIG. 1B. It the operations that are input through the game controller match as far as the standard operations 41 to 47, the display state of the identification symbols for the matching standard operations 41 to 47 is made to change. More specifically, identification symbols representing the standard operations 41 to 47 are made to light up, as shown in FIG. 1B. With this configuration, the player can readily perceive how far the matching occurs in the sequence of input operations.

In FIG. 1C, all of the operations that were input by the player match the standard operations 41 to 51, so that all of the identification symbol are lit and also a display 34 appears, to inform the player of the success of the special technique. If the special technique is successful and a great deal of damage has been inflicted on the enemy game character 32, the player can have an advantage over the opponent in the game.

The identification symbols in this embodiment will now be described. An identification symbol that represents a first standard operation 41 indicates that the operating button 14, which is a downward direction input means, has been pressed. In a similar manner, an identification symbol that represents a third standard operation 43 indicates that operating buttons 14 and 16 has been pressed simultaneously, and this operation means a lower-left direction input. It is comparatively difficult to press two operating buttons simultaneously and it often happens that the player has no confidence as to whether or not that operation has been successful in practice. With this embodiment, an operation that has been successfully input causes a lit display, thus solving this problem. Note that the identification symbols for the first and third standard operations 41 and 43 are black and white arrows, with a black arrow indicating that the operating button is to be pressed for a long time and the white arrow indicating that it is to be pressed for a short time.

An identification symbol that represents a second standard operation 42 indicates that a given time interval between the first standard operation 41 and third standard operation 43 has been inserted. With this embodiment, this time interval is, for example, a time of one frame (1/60 seconds) to five frames. Therefore, if the time interval from the first input operation to the third input operation is within the range of one frame to five frames, the operation is deemed to be successful. Such a time interval insertion operation is difficult for the player, and it often happens that the player is not confident concerning such an operation. With this embodiment, an operation that has been input successfully causes a lit display, thus solving the above problem.

An identification symbol that represents a fourth standard operation 44 indicates that the operating button 26 has been pressed. Displaying an image that is similar to the button arrangement on the game controller as an identification symbol makes it easy to identify the operation. As is clear from a comparison of the identification symbols that represent the fourth and seventh standard operations 44 and 47, operating buttons with different dispositions on the game controller are displayed in different colors in this embodiment. This makes it even easier to identify an operation from an identification symbol.

An identification symbol that represents a tenth standard operation 50 indicates that the operating buttons 22 and 24 have both been pressed. Thus standard operations and input operations of this embodiment include examples in which a plurality of operating buttons are combined.

Figure 2A:
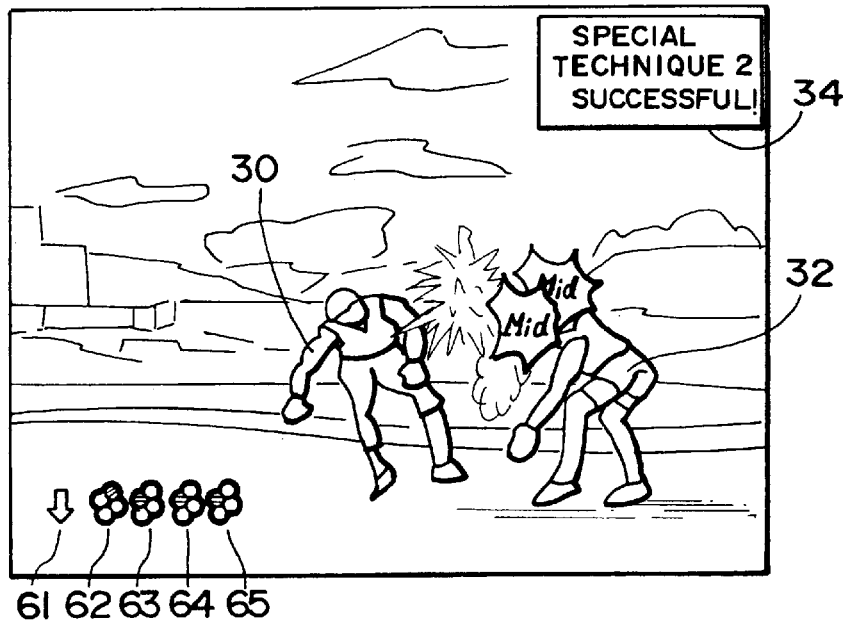
FIG. 2A shows an example of a game image displayed by this embodiment and FIGS. 2B and 2C are views illustrative of the sound synthesis processing of this embodiment.

Identification symbols that represent standard operations are displayed in FIGS. 1B and 1C, whereas identification symbols that represent first to fifth input operations 61 to 65 that have been input by the player are displayed in FIG. 2A. FIG. 2A illustrates an example in which the player has pressed the operating button 14 the first time, the operating button 20 the second time, and the operating button 26 the third to fifth times. A determination is made as to whether or not the input sequence that is specified by these input operations matches a standard sequence. Since the sequence shown in FIG. 2A does match, the game character 30 performs a special technique and the display 34 appears, to indicate the success of the special technique. Displaying the input operations of the player visually by using identification symbols in this manner makes it possible for the player to perceive which input operations are successful and which input operations are failures. This enables the player to acquire special techniques easily. With this type of game, it is difficult to practice operations, particularly to acquire special techniques, so it can happen that a player who is not confident about manipulation skills will avoid the game. However, this embodiment makes it possible to solve this type of problem.

Figure 2B:
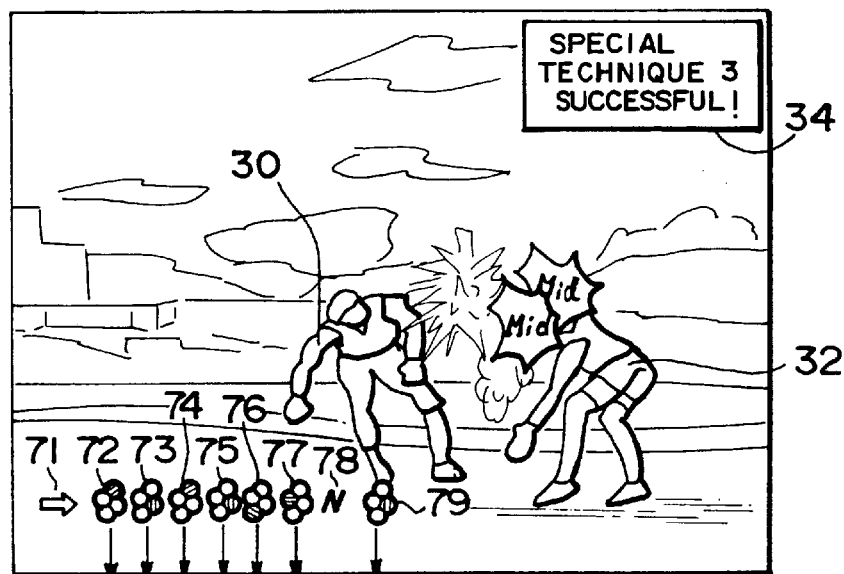
Figure 2C:

With this embodiment, when first to ninth input operations 71 to 79 are input, identification sounds A, B, C, and D can be sequentially output in correspondence with the details of each operation, as shown in FIG. 2B. The system then determines whether or not the input sequence that is specified by these input operations matches a standard sequence, and, if it does match, the game character 30 is made to perform the special technique and the display 34 appears, to indicate the success of the special technique. The identification sounds are made to have different pitches for differentiating between them, so that the player can readily perceive whether or not the input sequence was successful. For example, the operating button 20 is pressed in the second and fourth input operations 72 and 74, and an identification sound A is output at those times. Similarly, the operating button 22 is pressed in the third, fifth, and ninth input operations 73, 75, and 79, and an identification sound B that has a different pitch from the identification sound A is output at those times. Furthermore, the operating buttons 24 and 26 are pressed in the sixth and seventh input operations 76 and 77, respectively, and identification sounds C and D are output at those times. In FIG. 2C, an example of identification sounds produced by the standard operations in the standard sequence that is a condition for the performance of a special technique is approximately shown by using a musical staff. To perform a special technique, it is not only the sequence in which the operating buttons are pressed that is important, but also the subtle timing at which the operating buttons are pressed. For example, at G and H in FIG. 2C, it is necessary to press the operating buttons 20 and 22 rapidly in succession. It is also necessary to insert a given time interval at I in FIG. 2C. Such subtle adjustment of timing is a difficult task for a player. It is extremely difficult to describe such subtle timing in the manual or other documents provided with the game software.

This embodiment enables the player to perceive the details of operations that the player has input, aurally by the use of identification sounds. Since identification sounds are output as if the keys of a piano have been struck, it is easy to perceive not only which of the operating buttons has been pressed, but also the timing at which they are pressed. This enables easy adjustment of the timing required for performing the special technique.

It is preferable that the player can hear idealized identification sounds that are output in the standard operations performed by the computer at the reference timing in the standard sequence, if necessary. The player will hear the sounds indicated on the musical staff of FIG. 2C, for example. This configuration makes it possible for the player to learn aurally which operating buttons to press and the timing at which to press them. The operation of the special technique can be acquired by repeated practice of operating for a match between the sounds that are output by the operation of the game controller and learned sounds.

Note that an identification sound is not output for the first input operation 71 of FIG. 2B, but such a sound could equally well be output. When a plurality of operating buttons are pressed, it is also possible to output different identification sounds to match such combinations.

Figure 3:
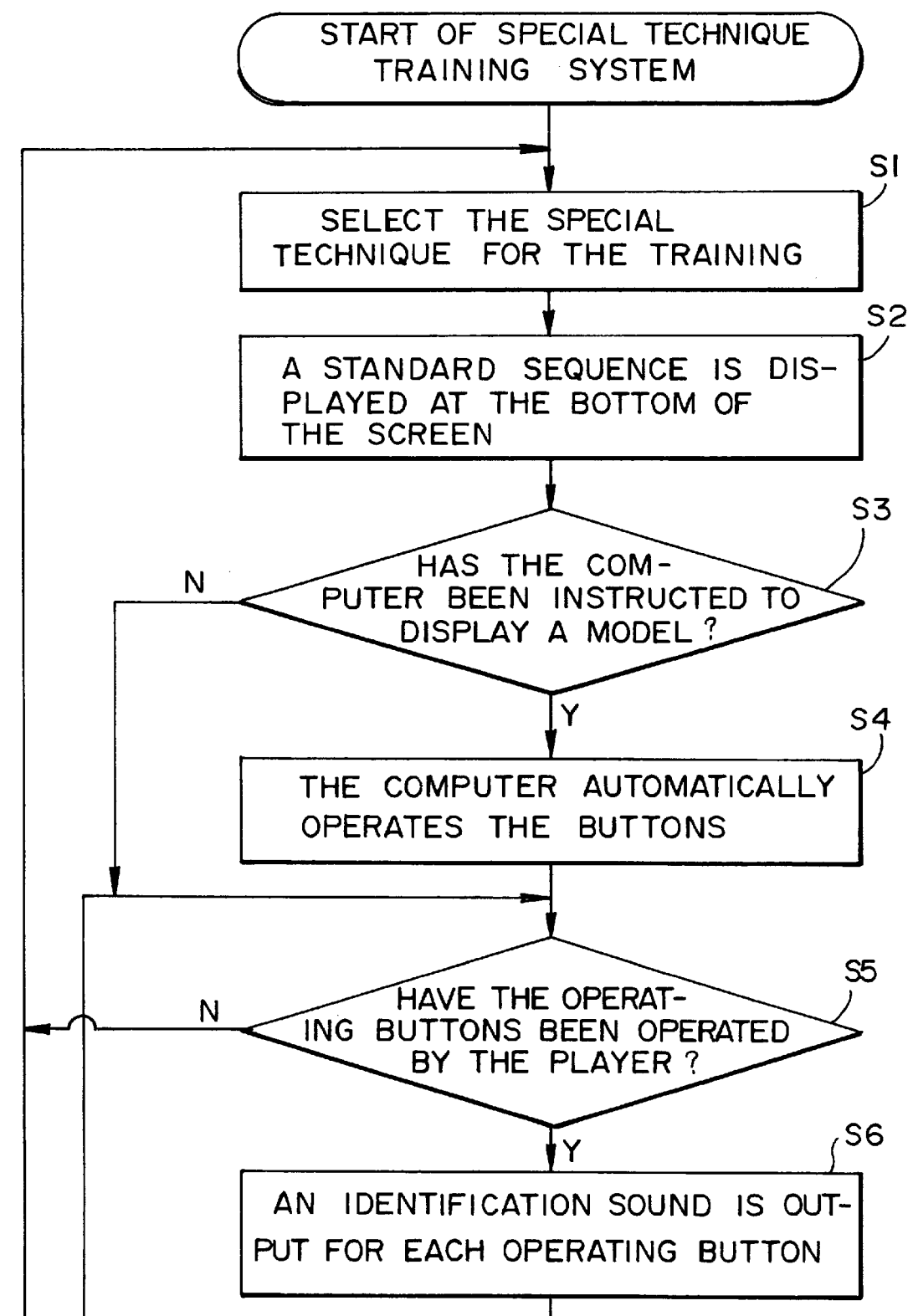
FIG. 3 is a flowchart of an example of the processing performed by this embodiment.

An example of the operation of this embodiment will now be described, with reference to a flowchart thereof shown in FIG. 3. Note that the description below relates to a case in which this invention is applied to a training mode designed to provide a player with manipulation practice. Although this invention is particularly effective when applied to a training mode, the scope of this invention should not be taken as being limited thereto.

The player first selects training mode from among various modes on a selection screen, as shown in FIG. 4. In this case, combat mode is a mode in which the player fights an opposing player or the computer, and option mode is a mode for setting various parameters such as playing time and game conditions. The player then selects a special technique that he wishes to practice, from a selection screen as shown in FIG. 4B. A standard sequence for the selected special technique is then displayed at the bottom of the screen, using identification symbols (steps S1 and S2). When the player then uses the game controller to direct the computer to display a model, the computer automatically operates the operating buttons (steps S3 and S4). This causes a game character manipulated by the computer to perform a model form of the special technique, as shown in FIG. 4C. During this time, the identification symbols are displayed in the standard sequence, and the identification sounds are output at the given timing in accordance with the standard sequence. By seeing and hearing this display, the player can learn the operation that produces the special technique, visually and aurally.

The system then determines whether or not the operating buttons have been pressed by the player and, if they have been pressed, it outputs identification sounds in correspondence with the pressed operating buttons (steps S5 and S6, and FIG. 2B). The identification sounds are output as sounds with musical notes that differ according to the pressed operating buttons, as if from a piano. The system then determines whether or not the input timing of the operating buttons and the sequence in which the operating buttons are pressed match those of the standard (steps S7 and S8). To perform the special technique, it is not sufficient to follow just the sequence in which the operating buttons are pressed; it is also necessary for the input timing to follow a timing that has been set previously by the program. The system determines that an input timing that is too fast or too slow is incorrect.

The system then causes the identification symbols to light as far as the point at which the standard sequence is matched (step S9, FIG. 1B). This makes it possible to readily perceive how far the sequential input of operating buttons was successful Subsequently, the system determines whether or not the special technique was successful (step S10) and, if it was successful, causes all of the identification symbols to flash (step S11, FIG. 1C). Finally, the input determination is reset (step S12) and the flow returns to step S1.

Figure 5:
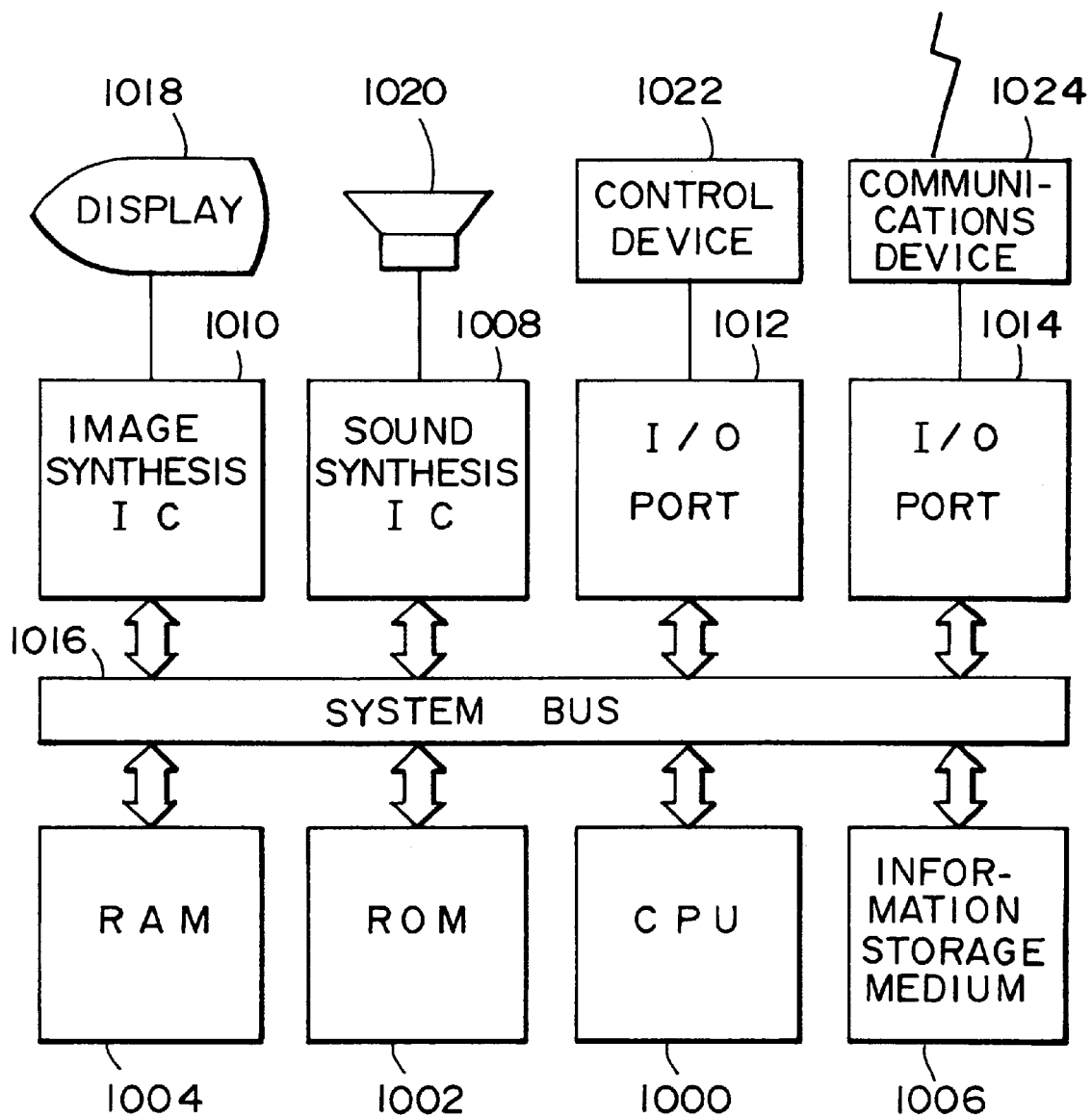
FIG. 5 shows an example of the configuration of games machine hardware that can be implemented by this embodiment.

A configurational example of the hardware of a games machine that enables the implementation of this embodiment will now be described, with reference to FIG. 5. In the games machine shown in this figure, a CPU 1000, ROM 1002, RAM 1004, information storage medium 1006, sound synthesis IC 1008, image synthesis IC 1010, and I/O ports 1012 and 1014 are connected together by a system bus 1016 so that data can be transferred therebetween. A display 1018 is connected to the image synthesis IC 1010, a speaker 1020 is connected to the sound synthesis IC 1008, a control device 1022 is connected to the I/O port 1012, and a communications device 1024 is connected to the I/O port 1014.

Image information or the like for representing a game program and display objects is mainly stored in the information storage medium 1006, and a CD-ROM, game cassette, DVD, IC card, MO disk, floppy disk, or memory is used therefor. Means such as a CD-ROM, game cassette, or DVD could be used as an In information storage medium for storing a game program for a domestic games machine, for example. Memory such as ROM could be used for an arcade games machine, in which case the information storage medium 1006 becomes the ROM 1002.

Figure 6A:
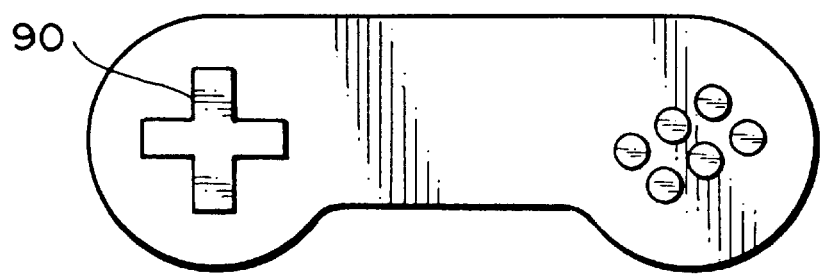
FIGS. 6A, 6B and 6C show various examples of game controllers.
Figure 6B:
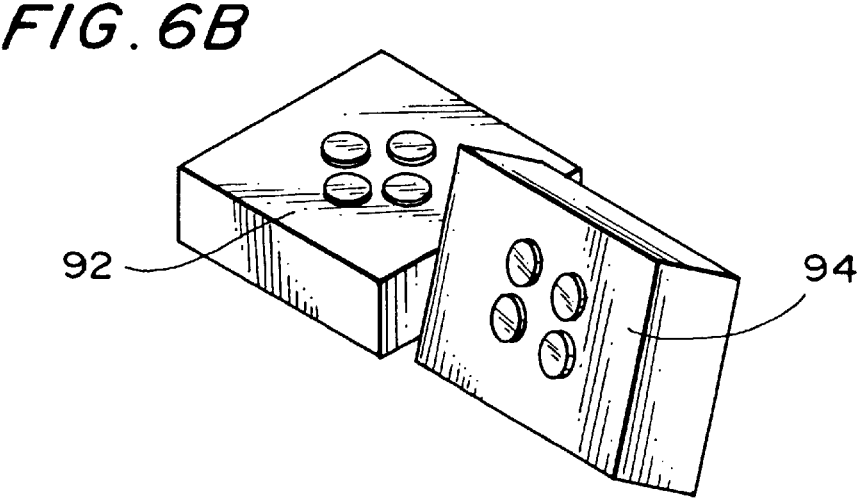
Figure 6C:
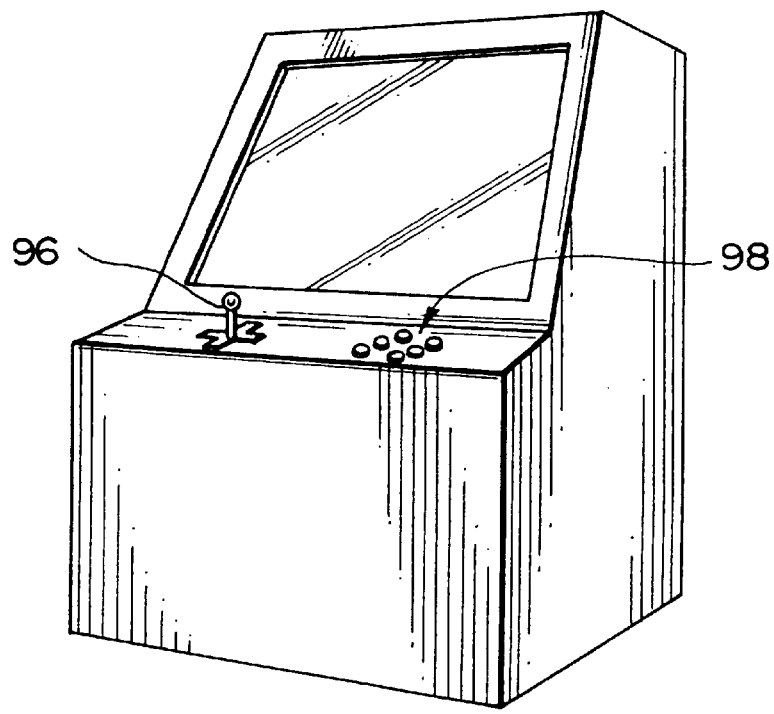

The control device 1022 is equivalent to the game controller and it is used as a device for inputting into the main unit of the games machine the effects of decisions made by the player as the game progresses. Examples of the game controller are shown in FIGS. 6A, 6B, and 6C. In the example shown in FIG. 6A, a cross-shaped key 90 is used to input direction. In the example shown in FIG. 6B, grasping portions 92 and 94 are freely and mutually rotatable, and the angle of rotation thereof when they are rotated can be used as operating information. The example shown in FIG. 6C is an operating panel type of device that is widely used in an arcade games machine, wherein the game operations are performed by a joystick 96 that forms a direction input means and a group of operating buttons 98.

The CPU 1000 controls the entire apparatus and processes data in accordance with a game program stored in the information storage medium 1006, a system program stored in the ROM 1002, and signals input through the control device 1022. The RAM 1004 is a storage means that is used as a work space for the CPU 1000, and given details from the information storage medium 1006 or the ROM 1002, or the results of computations by the CPU 1000, are stored therein.

The provision of the sound synthesis IC 1008 and the image synthesis IC 1010 in this type of games machine makes it possible to output game sounds and game images. The sound synthesis IC 1008 is an integrated circuit that synthesizes game sounds such as sound effects and background music, based on information stored in the information storage medium 1006 or the ROM 1002, and the thus synthesized game sounds are output by the speaker 1020. The image synthesis IC 1010 is an integrated circuit that synthesizes pixel information for output to the display 1018, based on image information that is sent from components such as the RAM 1004, the ROM 1002, and the information storage medium 1006. Note that a device called a head-mounted display (HMD) could be used as the display 1018.

The communications device 1024 is designed to transfer various types of information used within the games machine to and from external devices, and it is used to transfer given information in accordance with a game program to and from another games machine connected thereto, or transfer information such as a game program through a communication line.

The image synthesis processing described with reference to FIGS. 1B, 1C, 2A, and 4A to 4C and the sound synthesis processing described with reference to FIGS. 2B and 2C is implemented by components such as the information storage medium 1006 that contains a game program for performing processing such as that shown in the flowchart of FIG. 3, the CPU 1000 that operates in accordance with the game program, the image synthesis IC 1010, and the sound synthesis IC. Note that the processing performed by the image synthesis IC 1010 and the sound synthesis IC 1008 could be performed in a software manner by means such as the CPU 1000 or an ordinary digital signal processor (DSP).

Figure 7A:
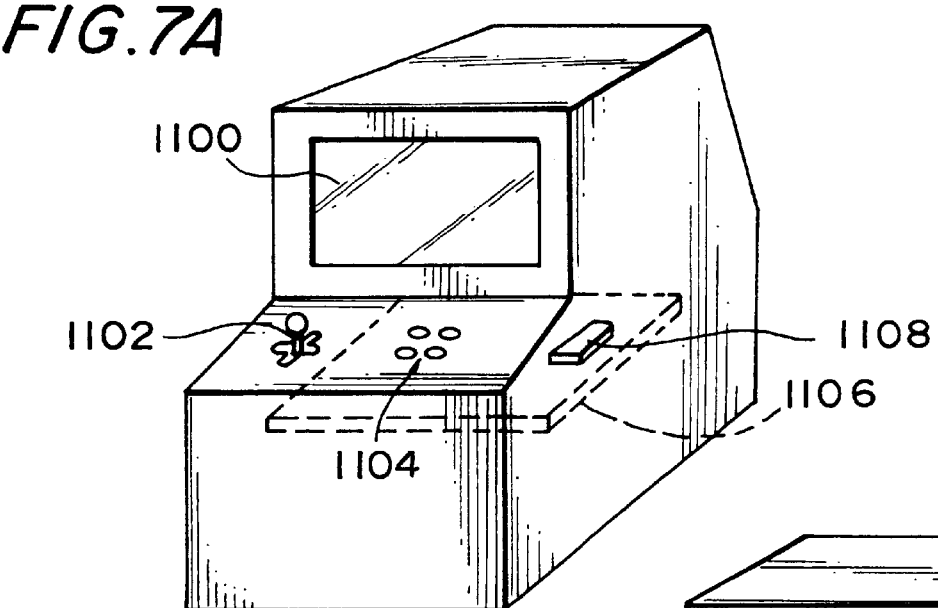
FIGS. 7A, 7B, and 7C show various forms of devices to which this embodiment can be applied.

An example of this embodiment applied to an arcade games machine is shown in FIG. 7A. A player enjoys the game by operating a joystick 1102 and buttons 1104, while viewing a game image projected onto a display 1100. Components such as a CPU, image synthesis IC, and sound synthesis IC are mounted on an IC board 1106 built into the apparatus. A memory 1108 is an information storage medium mounted on the IC board 1106. Information that is stored in the memory 1108 includes information for determining whether or not an input sequence matches a given standard sequence, the input sequence being specified by a first input operation that is input first by a game controller, a second input operation that is input second by the game controller, and so on until an Nth (where N≧2) input operation that is input at an Nth time by the game controller; information for providing at least one of a display that indicates matched input operation and a display that indicates non-matched input operations, the display being provided by using identification symbols for visually identifying the details of each operation; and information for sequentially outputting identification sounds for aurally identifying the details of the first to Nth input operations, synchronizing the output of the identification sounds with input timing of the first to Nth input operations. This information is hereinafter called stored information. This stored information comprises at least one type of information, such as program coding for performing the above described processing, image information, sound information, shape information for display objects, table data, list data, or player information.

Figure 7B:
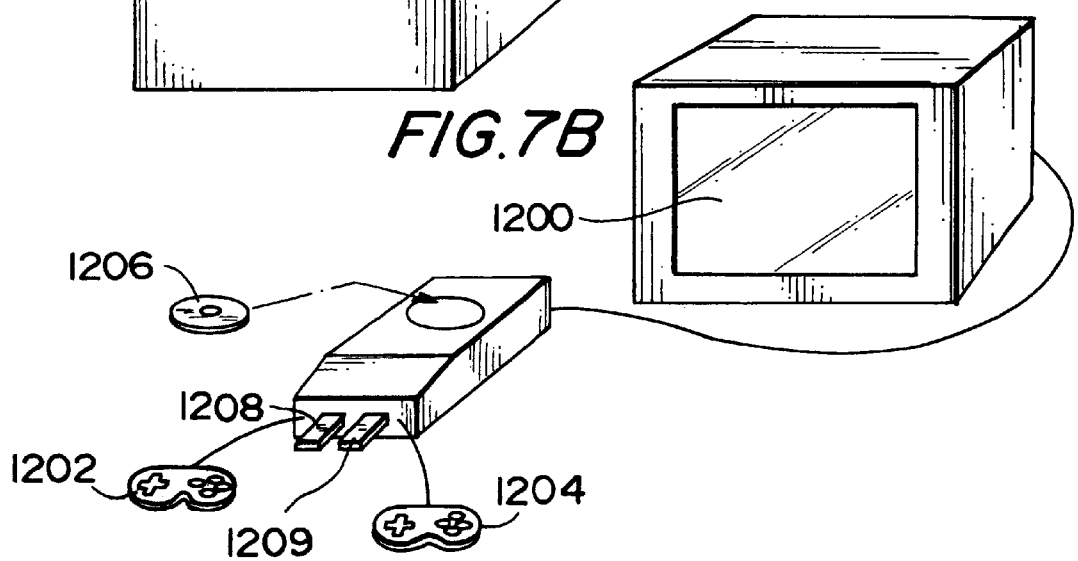

An example of this embodiment applied to a domestic games machine is shown in FIG. 7B. Players enjoy the game by operating game controllers 1202 and 1204 while viewing a game image that is projected onto a display 1200. In this case, the above described stored information is stored in a CD-ROM 1206 or IC cards 1208 and 1209 or the like, which is an information storage medium that can be freely inserted into and removed from the main unit.

Figure 7C:
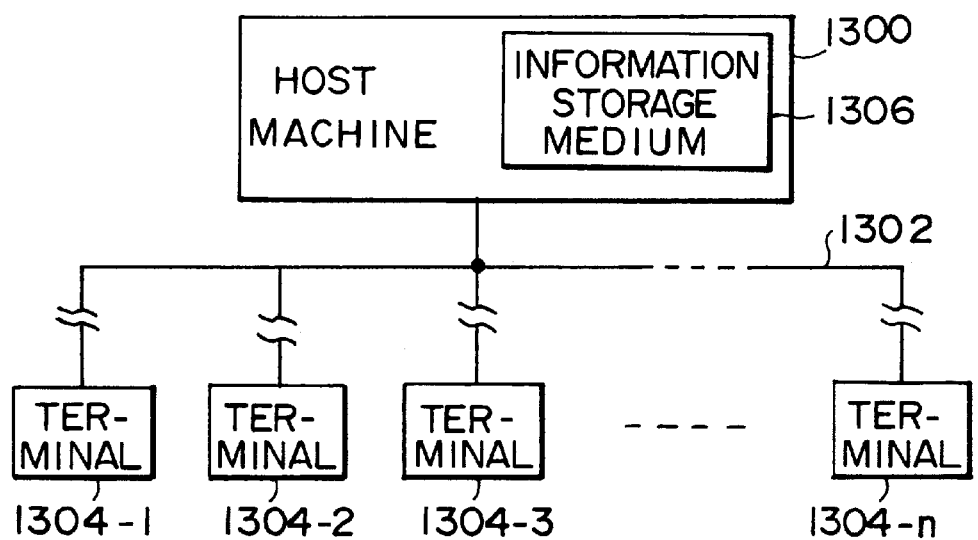

Another example of this embodiment applied to a games machine is shown in FIG. 7C, where the games machine comprises a host machine 1300 and terminals 1304-1 to 1304-n connected to the host machine 1300 by a communication line 1302. In this case, the above described stored information is stored in an information storage medium 1306 such as a magnetic disk, magnetic tape, or memory that can be controlled by the host machine 1300. If each of the terminals 1304-1 to 1304-n has a CPU, an image synthesis IC, and a sound synthesis IC so that game images and sounds can be synthesized thereby in a standalone manner, means such as a game program for synthesizing game images and sounds is transferred from the host machine 1300. On the other hand, if they cannot be synthesized in a stand-alone manner, the configuration is such that the host machine 1300 creates the game images and sounds then transfers them to the terminals 1304-1 to 1304-n for output by those terminals.

Note that this invention is not limited to the embodiments thereof described above and thus it can be implemented in many various ways.

For example, input operations and standard operations that respectively specify an input sequence and a standard sequence are not limited to those described with reference to this embodiment. Furthermore, the identification symbols and sounds are not limited to the examples of this embodiment, and various other methods can be used to facilitate identification by the player.

The method of indicating matching between the standard sequence and input sequence is similarly not limited to that shown in FIGS. 1B and 1C; various different methods of displaying matching identification symbols alone could be used, for example.

This invention is particularly effective when applied to the input of operations for special techniques of fighting games, but the range of applicability of the invention is not limited thereto and it can equally well be applied to various other games such as sports game (such as tennis, baseball, skiing, or soccer), racing games (using vehicles, horses, boats or the like), shooting games, and role-playing games. Furthermore, although this invention is particularly effective when applied to a training mode, it is not limited to a training mode; it can equally well be applied to other modes such as a combat mode against an opposing player.

This invention can not only be applied to a domestic or arcade games machine, it can also be applied to various other kinds of games machines such as simulators, large games machines for an attraction where many players can participate, personal computers, multimedia terminals, and IC boards that synthesize games images.

What is claimed is:

1. An image synthesis method for synthesizing a game image, the method comprising:

determining whether an input operation sequence matches a given standard operation sequence, said input operation sequence being specified by N input operations that are sequentially input by a game controller, N being at least equal to two; and providing at least one of a display that indicates matched input operations and a display that indicates non-matched input operations, said display being provided by using identification symbols for visually identifying details of each input operation.

2. The image synthesis method of claim 1, wherein:

details of the N standard operations that specify said standard sequence are displayed beforehand by using identification symbols; and when first to Mth input operations match the first to Mth standard operations, M being at most equal to N, a display state of identification symbols of matching first to Mth standard operations is caused to changed.

3. The image synthesis method as defined in claim 1, wherein:

when said game controller has a plurality of operating buttons, at least one of said identification symbols is a symbol that identifies which of said plurality of operating buttons has been operated.

4. The image synthsis method as defined in claim 3, wherein:

at least one of said identification symbols is a symbol with different colors to represent operating buttons having different dispositions on said game controller.

5. The image synthesis method as defined in claim 1, wherein:

when said game controller has a direction input means for inputting a plurality of directions, at least one of said identification symbols is a symbol for identification one direction of said plurality of directions.

6. The image synthesis method of claim 1, wherein:

at least one of said identification symbols is a symbol indicating an insertion of a given time interval between a (K−1)th input operation and a Kth input operation, K being at most equal to N.

7. The image synthesis method of claim 1, further comprising:

sequentially outputting identification sounds for aurally identifying the details of each operation, synchronizing an output of said identification sounds with at least one of input timing of said N input operations and reference timing of said standard sequence.

8. The sound synthesis method as defined in claim 1, wherein:

said identification symbols are displayed in a training mode for enabling a player to practice operations.

9. The image synthesis method as defined in claim 8, wherein:

display of said identification symbols in accordance with said standard sequence is performed in training mode by a computer as selected by a player.

10. An image synthesis method for synthesizing a game image, the method comprising:

displaying identification symbols for visually identifying details of each input operation when N input operations are sequentially input by a game controller, N being at least equal to two; and determining whether or not an input sequence specified by said N input operations matches a given standard sequence.

11. The image synthesis method as defined in claim 10, wherein:

when said game controller has a plurality of operating buttons, at least one of said identification symbols is a symbol that identifies which of said plurality of operating buttons has been operated.

12. The image synthesis method as defined in claim 11, wherein:

at least one of said identification symbols is a symbol with different colors to represent operating buttons having different dispositions on said game controller.

13. The image synthesis method as defined in claim 10, wherein:

when said game controller has a direction input means for inputting a plurality of directions, at least one of said identification symbols is a symbol for identifying one direction of said plurality of directions.

14. The image synthesis method of claim 10, wherein:

at least one of said identification symbols is a symbol indicating an insertion of a given time interval between a (K−1)th input operation and a Kth input operation, K being at most equal to N.

15. The image synthesis method of claim 10, further comprising:

sequentially outputting identification sounds for aurally identifying the details of each operation, synchronizing an output of said identification sounds with at least one of input timing of said N input operations and reference timing of said standard sequence.

16. The image synthesis method as defined in claim 10, wherein:

said identification symbols are displayed in a training mode for enabling a player to practice operations.

17. The image synthesis method as defined in claim 16, wherein:

display of said identification symbols in accordance with said standard sequence is performed in training mode by a computer as selected by a player.

18. A sound synthesis method for synthesizing game sounds, the method comprising:

sequentially outputting identification sounds for aurally identifying details of each input operation, synchronizing an output of said identification sounds with input timing of each input operation, when N input operations are sequentially input by a game controller, N being at least equal to two; and determining whether or not an input sequence specified by said N input operations matches a given standard sequence.

19. The sound synthesis method as defined in claim 18:

sequentially outputting said identification sounds corresponding to said standard sequence, synchronizing the output of said identification sounds with the reference timing of said standard sequence.

20. The sound synthesis method as difined in claim 18, wherein:

said identification sounds are output in a training mode for enabling a player to practice operations.

21. The sound synthesis mehtod as defined in claim 20, wherein:

output of said identification sounds in accordance with said standard sequence is performed in training mode by a computer as selected by a player.

22. A games machine for synthesizing game images and game sounds, comprising:

means for determining whether an input operation sequence matches a given standard operation sequence, said input operation sequence being specified by N input operations that are sequentially input by a game controller, N being at least equal to two; and means for providing at least one of a display that indicates matched input operations and a display that indicates non-matched input operations, said display being provided by using identification symbols for visually identifying details of each input operation.

23. A games machine for synthesizing game images and games sounds, comprising:

means for displaying identification symbols for visually identifying details of each input operation when N input operations are sequentially input by a game controller, N being at least equal to two; and means for determining whether or not an input sequence specified by said N input operations matches a given standard sequence.

24. A games machine for synthesizing game images and game sounds, comprising:

means for sequentially outputting identification sounds for aurally identifying details of each input operation, synchronizing an output of said identification sounds with input timing of each input operation, when N input operations are sequentially input by a game controller, N being at least equal to two; and means for determining whether or not an input sequence specified by said N input operations matches a given standard sequence.

25. An information storage medium for synthesizing a game image, comprising:

information for determining whether an input operation sequence matches a given standard operation sequence, said input operation sequence being specified by N input operations that are sequentially input by a game controller, N being at least equal to two; and information for providing at least one of a display that indicates matched input operations and a display that indicates non-matched input operations, said display being provided by using identification symbols for visually identifying details of each input operation.

26. An information storage medium for synthesizing a game image, comprising:

information for displaying identification symbols for visually identifying details of each input operation when N input operations are sequentially input by a game controller, N being at least equal to two; and information for determining whether or not an input sequence specified by said N input operations matches a given standard sequence.

27. An information storage medium for synthesizing a game sound, comprising:

information for sequentially outputting identification sounds for aurally identifying details of each input operation, synchronizing an output of said identification sounds with input timing of each input opeeration, when N input operations are sequentially input by a game controller, N being at least equal to two; and information for determining whether or not an input sequence specified by said N input operations matches a given standard sequence.

28. An image and sound synthesis method for synthesizing a game image and game sounds, the method comprising:

displaying identification symbols for visually identifying details of input operations, sequentially outputting identification sounds for aurally identifying the details of each input operation, synchronizing the output of said identification sounds with input timing of each input operation, when a N input operations are sequentially input by a game controller, N being at least equal to two;

determining whether an input operation sequence specified by said N input operations matches a given standard operation sequence; and providing at least one of a display that indicates matched input operations and a display that indicates non-matched input operations, said display being provided by using identification symbols for visually identifying the details of each input operation.

29. A games machine for synthesizing game images and game sounds, comprising:

means for displaying identification symbols for visually identifying details of input operations, when N input operations are sequentially input by a game controller N being at least equal to two;

means for sequentially outputting identification sounds for aurally identifying the details of each input operation, synchronizing the output of said identification sounds with input timing of each input operation, when the N input operations are sequentially input by a game controller;

means for determining whether an input operation sequence specified by said N input operations matches a given standard operation sequence; and means for providing at least one of a display that indicates matched input operations and a display that indicates non-matched input operations, said display being provided by using identification symbols for visually identifying the details of each input operation.

30. An information storage medium for synthesizing a game image and game sounds, comprising:

information for displaying identification symbols for visually identifying details of input operations when N input operations are sequentially input by a game controller N being at least equal to two;

information for sequentially outputting identification sounds for aurally identifying the details of each input operation, synchronizing the output of said identification sounds with input timing of each input operation, when the N input operations are sequentially input by a game controller;

information for determining whether an input operation sequence specified by said N input operations matches a given standard operation sequence; and information for providing at least one of a display that indicates matched input operations and a display that indicates non-matched input operations, said display being provided by using identification symbols for visually identifying the details of each input operation.

* * * * *